(12) United States Patent
Drewery (10) Patent No.: US 6,180,004 B1
(45) Date of Patent: Jan. 30, 2001

(54) INTERCONNECTED TANK ASSEMBLY OF A WASTEWATER TREATMENT SYSTEM

(75) Inventor: T. Gig Drewery, Kountze, TX (US)

(73) Assignee: Aqua Partners, Ltd., Lumberton, TX (US)

( * ) Notice: Under 35 U.S.C. 154(b), the term of this patent shall be extended for 0 days.

(21) Appl. No.: 09/271,952

(22) Filed: Mar. 18, 1999

(51) Int. Cl.[7] ..................................................... B01D 1/00
(52) U.S. Cl. ...................... 210/221.2; 210/252; 210/255; 210/258; 210/261
(58) Field of Search ................................ 210/220, 221.1, 210/221.2, 252, 258, 255, 261

(56) References Cited

U.S. PATENT DOCUMENTS

| | | | | |
|---|---|---|---|---|
| 4,154,685 | * | 5/1979 | Marcotte | 210/255 |
| 4,376,702 | * | 3/1983 | Small | 210/201 |
| 5,080,793 | * | 1/1992 | Urlings | 210/603 |
| 5,435,914 | * | 7/1995 | Bernhardt | 210/220 |
| 6,013,180 | * | 1/2000 | Wang | 210/232 |

OTHER PUBLICATIONS

Hoot Aerobic Treatment Systems Installers Manual, Jun. 1996, pp. 1–4.

Ecological Tanks, Inc. Brochure.

* cited by examiner

Primary Examiner—Chester T. Barry
(74) Attorney, Agent, or Firm—Harrison & Egbert (57) ABSTRACT

A wastewater treatment system having a treatment tank with an inlet and an outlet, a pump tank having an inlet in fluid communication with the outlet of the treatment tank, and a connector affixed to a wall of the treatment tank and to a wall of the pump tank so as to maintain the treatment tank and the pump tank in fixed spaced relationship to each other. A pretreatment tank has an outlet in fluid communication with the inlet of the treatment tank. The connector is affixed to the wall of the pretreatment tank so as to maintain the pretreatment tank and the treatment tank in fixed spaced relationship to each other. The bottoms of the treatment tank, the pump tank and the pretreatment tank are arranged in coplanar relationship. The connector is in the form of a band extending around a portion of a circumference of the walls of the treatment tank, the pump tank and the pretreatment tank. A saddle member is interpose between the walls of the treatment tank, the pump tank and the pretreatment tank so as to maintain each of these tanks a fixed distance from each other. The band extends around these tanks in compressive relationship therewith.

24 Claims, 6 Drawing Sheets

INTERCONNECTED TANK ASSEMBLY OF A WASTEWATER TREATMENT SYSTEM

TECHNICAL FIELD

The present invention relates to wastewater treatment systems of the type having an aerobic treatment unit combination with a pretreatment tank and/or a pump tank. More particularly, the present invention relates to such systems in which each of the tanks is interconnected together for the purpose of transportation and installation.

BACKGROUND ART

Recently, home wastewater treatment systems have become increasingly popular. Prior to the development of home wastewater treatment systems, septic tanks were the conventional manner of cleaning home and small commercial establishment wastes from the water. In view of the great cost associated with connecting a home sewage system with the city sewage system, it is economically beneficial to employ the use of home wastewater treatment systems. Present home wastewater treatment systems are a downsized, underground version of the treatment processes employed by large central treatment plants.

Essentially, the treatment process correlates with an example found in nature. When a creek runs through rocks and over logs, turbulence is created and oxygen is captured. Aerobic bacteria utilize oxygen in their digestion processes. This allows the creek to purify itself. The home wastewater treatment systems simply employ a speeded-up version of this process in a manner known as "extended aeration". Air or oxygen is brought in by means of an efficient air pump and then diffused into thousands of tiny air bubbles by means of fine air diffusion. As these tiny bubbles move upward through the wastewater, oxygen is captured and the same purification process takes place. Such a system can allow normal household waste water to be reduced to a clear odorless liquid.

One such system has been manufactured and sold by Hydro-Action, Inc. of P.O. Box 12583, Beaumont, Tex. The system is known as the HYDRO-ACTION (TM) system. It is a self-contained automatic system. The HYDRO-ACTION (TM) system incorporates two separate compartments, each performing a specific function in the digestion process. First, raw waste water enters the aeration compartment and is mixed with activated sludge and aerated. An air pump injects large quantities of air into this compartment by means of porous ceramic diffusers located above the bottom perimeter of the aeration compartment. These diffusers create thousands of tiny air bubbles which provide oxygen for the aerobic digestion process and mixes the compartment's entire contents. These tiny bubbles provide better air-to-liquid contact so as to hasten the aerobic digestion process. Aerobic bacteria then use the oxygen in solution to break down the wastewater so as to convert the wastewater into an odorless liquid and gas. Hydraulic displacement causes the mixture to enter the second and final compartment. Due to the calm conditions and sloping walls of the clarification compartment, any remaining settleable material is encouraged to return to the aeration compartment for further treatment. The remaining effluent, upon reaching the outlet piping, is clear and odorless.

This HYDRO-ACTION (TM) system allows homes to be built on clay soil, rock or high water tables. This system also helps to protect the ground water supplies and eliminates gross pollution of ditches and streams. The effluent discharged from such a system is allowed by some state and local regulatory agencies to be discharged directly to a stream or pond or used to surface irrigate lawns and pastures. In areas where surface discharge is not allowed, subsurface disposal methods can be used with good success.

Conventionally, in such extended aeration treatment systems, a control panel is connected to the wastewater treatment system so as to control and monitor the conditions within the treatment tank. An air pump is also used so as to supply air to the aerators and diffusers within the aeration compartment of the tank. The control panel is typically electrically connected to the air pump so as to monitor the pressure delivered by the air pump. In conventional practice, a wastewater treatment tank will be buried in the earth a suitable distance away from a home or a commercial establishment. Since these wastewater treatment tanks are relatively large (at least 500 gallons capacity), a significant hole must be formed in the earth so as to accommodate the wastewater treatment system. After the wastewater treatment system is installed into the earth, only the cover of the access opening of the tank will be exposed above the earth. In normal practice, the control panel will be placed onto a wall of the home or commercial establishment or on a pedestal. The air pump will be placed in a location generally adjacent to the wall of the commercial establishment or home. So as to allow the electrical lines from the control panel to reach the tank, it is necessary to trench the earth so as to allow conduits to extend from the home or commercial establishment to the tank. Similarly, trenching must be carried out in the earth so as to allow the air lines from the air pump to pass to the treatment tank. Additional trenching may be required so as to allow the electrical lines from the control panel to be connected to the air pump.

This process of trenching the earth is a very time consuming and tedious process. Many homeowners are reluctant to allow such trenching to occur. Typically, the installers of such extended aeration wastewater treatment systems will take shortcuts in the installation of the electrical conduits and air lines. Under certain circumstances, these lines will cross in the earth. In other circumstances, separate trenches will not be formed for the electrical lines and for the air lines. Instead, the installer of the extended aeration wastewater treatment system will simply attempt to place the air lines and the electrical lines together in a single trench. This practice is improper since the crossing of the air lines and the electrical lines can pinch the air lines so as to reduce air flow to the aeration system. Furthermore, when the electrical lines and the air lines are installed in this manner, any settling of the earth will cause the air line to become pinched.

Normally, the air pump must be placed on a graded surface. As such, the installer must grade a section of the earth so as to allow for the placement of the air pump on a level surface. Under certain circumstances, the air pump will be placed upon a concrete base so as to be properly supported in a desired position above the earth. The installation of the air pump and the construction of the base for the air pump takes a great deal of time during the installation of such aerobic wastewater treatment systems.

When the control panel is installed onto the wall of the house, it is necessary for the installer to drill holes in the wall of the house and to position the control panel in a desired location. Under certain circumstances, the homeowner may not wish to have a control panel placed on the wall of the house. Under other circumstances, the placement of the control panel on the wall of the house is in a difficult to reach or otherwise undesirable location. In any event, a great deal of labor is required to properly place the control panel on the house.

In the installation of the control panel and the air pump, the installer is required to have a suitable level of knowledge of electrical circuitry. This knowledge is required so as to allow the installer to properly connect the electrical line to the air pump components and to the treatment tank components. Wires must be extended over a great deal of distance within conduits so as to allow the proper electrical connections to be made. If an improper electrical connection is made, then the aerobic wastewater treatment system will not function in the desired manner. In other circumstances, short circuits can occur if the electrical lines are not installed properly. It has been found that the typical installer of such aerobic wastewater treatment systems lacks sufficient knowledge in electrical circuitry to effectively install the wastewater treatment system. Under certain circumstances, electricians must be called in so as to complete the connections.

Whenever it is necessary to service such extended aeration wastewater treatment systems, the person carrying out the service must move back and forth between the control panel, the air pump and the tank so as to properly test the system. This can be a tedious task which requires several trips back and forth between the various components of the system. Under other circumstances, two persons will be required to effectively test and service the treatment tank. For example, it is often necessary to have one person stationed by the air pump while the other person is inspecting the interior of the treatment tank. In other circumstances, one person must be stationed by the control panel while the other person is stationed by the treatment tank. The arrangement of the air pump, the control panel and the treatment tank in conventional systems greatly complicates the ability to properly service the treatment tank.

In certain circumstances, a pump tank is connected to the treatment tank of the extended aeration system. The pump tank is used so as to receive water from the treatment tank and to allow the liquid from the treatment tank to be pumped for irrigation or any disposal purposes. The pump tank has a liquid pump located within the interior of the tank. Whenever a pump tank is used, it is necessary to further trench the earth so as to allow for the installation of the electrical power supply line to reach the pump tank. Normally, this requires a conduit to be installed in the earth for the distance from the control panel to the pump tank. Typically, several electrical lines must extend from the control panel to the pump tank. The installation of the pump tank greatly complicates the ability to install the wastewater treatment system. Additionally, further electrical knowledge is required so as to effectively connect the various leads of the electrical lines to the pump tank with the connectors from the control panel.

Additionally, certain wastewater treatment systems utilize a pretreatment tank for the removal of large solids from the wastewater flowing from the residential or commercial establishment. Typically, this pretreatment tank will be of at least 250 gallon capacity that must be buried in an area adjacent to the treatment tank. The pretreatment tank will be connected to the treatment tank such that liquids and suspended solids will flow from the pretreatment tank into the treatment tank through the action of fluid displacement. In conventional practice, a separate excavation is made for the pretreatment tank so that it can be installed into the earth. Under certain circumstances, the pretreatment tank will have a different height than that of the treatment tank. In order to properly install the pretreatment tank, extensive work must be carried out at the excavation so that the pretreatment tank can be properly supported in the earth and properly connected to the inlet of the treatment tank. This excavation work is both costly and time consuming. Under certain circumstances, the pretreatment tank will be improperly positioned within the earth so that an eventual breaking of the connection between the pretreatment tank and the treatment tank occurs. In normal practice, the pretreatment tank is not installed in assembled combination with the treatment tank and the pump tank.

In view of the electrical, mechanical, and fluidic components of these extended aeration wastewater treatment systems, the installation of such systems into the earth becomes a difficult problem. Conventionally, the tanks will be installed and then the fluidic, mechanical and electrical connections established. Whenever such work is necessary "on site", the cost of installation becomes increasingly expensive and time consuming. Additionally, depending on the skill of the installation personnel, improper fluidic, electrical and mechanical connections may be established. As such, a need has developed in which to interconnect each of the tanks together, and to establish the fluidic, electrical and mechanical connections, prior to the installation of the system into the earth.

It is an object of the present invention to provide a wastewater treatment system in which each of the tanks used in the system are interconnected prior to installation.

It is another object of the present invention to provide a wastewater treatment system in which the fluidic, electrical and mechanical connections for the system are largely established prior to installation into the earth.

It is a further object of the present invention to provide a wastewater treatment system which minimizes the amount of excavation work which must be carried out for the installation of the system.

It is a further object of the present invention to provide a wastewater treatment system which assures a proper spacing and proper positioning of each of the tanks with respect to each other.

It is still another object of the present invention to provide a wastewater treatment system which minimizes the number of actual electrical, fluidic and mechanical connections that must be made following installation into the earth.

Another object of the present invention is to maintain tank geometry for manufacturing case and far structural integrity.

These and other objects and advantages of the present invention will become apparent from a reading of the attached specification and appended claims.

SUMMARY OF THE INVENTION

The present invention is a wastewater treatment system that comprises a treatment tank having an inlet and an outlet, a pump tank having an inlet in fluid communication with the outlet of the treatment tank, and a connector affixed to a wall of the treatment tank and to a wall of the pump tank so as to maintain the treatment tank and the pump tank in fixed spaced relationship to each other. A pretreatment tank has an outlet in fluid communication with the inlet of the treatment tank. The wall of the pretreatment tank is separate from the wall of the treatment tank. The connector is affixed to a wall of the pretreatment tank so as to maintain the pretreatment tank and the treatment tank in fixed spaced relationship to each other.

In the present invention, the bottoms of the treatment tank, the pump tank and the pretreatment tank are in generally coplanar relationship to each other. Each of the tanks is formed of a fiberglass material. The pump tank and the pretreatment tank have a generally similar height.

In the preferred embodiment of the present invention, the connector comprises a first band extending around a portion of a circumference of the wall of the treatment tank and a portion of the circumference of the wall of the pump tank. A saddle member is interposed between the wall of the treatment tank and the wall of the pump tank. This saddle member is adapted to maintain the wall of the treatment tank a fixed distance from the wall of the pump tank. The first band extends in compressive contact with the walls of the treatment tank and the pump tank. A spacer member is affixed around either the outlet of the treatment tank or the inlet of the pump tank and is adapted to maintain the wall of the treatment tank a fixed distance from the wall of the pump tank. A second band extends in compressive contact with the walls of the treatment tank and the pump tank. This second band is in spaced parallel relationship with the first band. In a preferred embodiment of the present invention, the first and second bands form a generally figure eight configuration around the walls of the treatment tank and the pump tank. In an alternative embodiment of the present invention, the bands form generally oval configurations extending around the walls of the treatment tanks.

When the present invention utilizes the pretreatment tank, the first band extends in compressive contact around a portion of the circumference of the pretreatment tank, a portion of a circumference of the wall of the treatment tank, and a portion of a circumference of the wall of the pump tank. A second saddle member is interposed between the wall of the pretreatment tank and the wall of the treatment tank so as to maintain the wall of the pretreatment tank a fixed distance from the wall of the treatment tank. Additionally, a second spacer member may be affixed to either the outlet of the pretreatment tank or the inlet of the treatment tank so as to maintain the wall of the pretreatment tank a fixed distance from the wall of the treatment tank. The first and second bands can form a generally double figure eight configuration around the pretreatment tank, the treatment tank and the pump tank or can form a generally oval configuration extending around all of the tanks. In the present invention, each of the tanks has a generally cylindrical configuration.

In an alternative form of the present invention, this connector can be a polymeric material adhered to the walls of the tanks and filling a space between the walls of the tanks. In another form of the present invention, the connector can be a flange which is formed at the bottom or top of the tanks and connected to a rigid member affixed to the flanges and extending between each of the tanks. This rigid member can be either a flat plate or an angle bracket. Still further, and alternatively, the tanks can be connected together by a plurality of bolts secured to the walls of the tanks.

DETAILED DESCRIPTION OF THE PRESENT INVENTION

Figure 1:
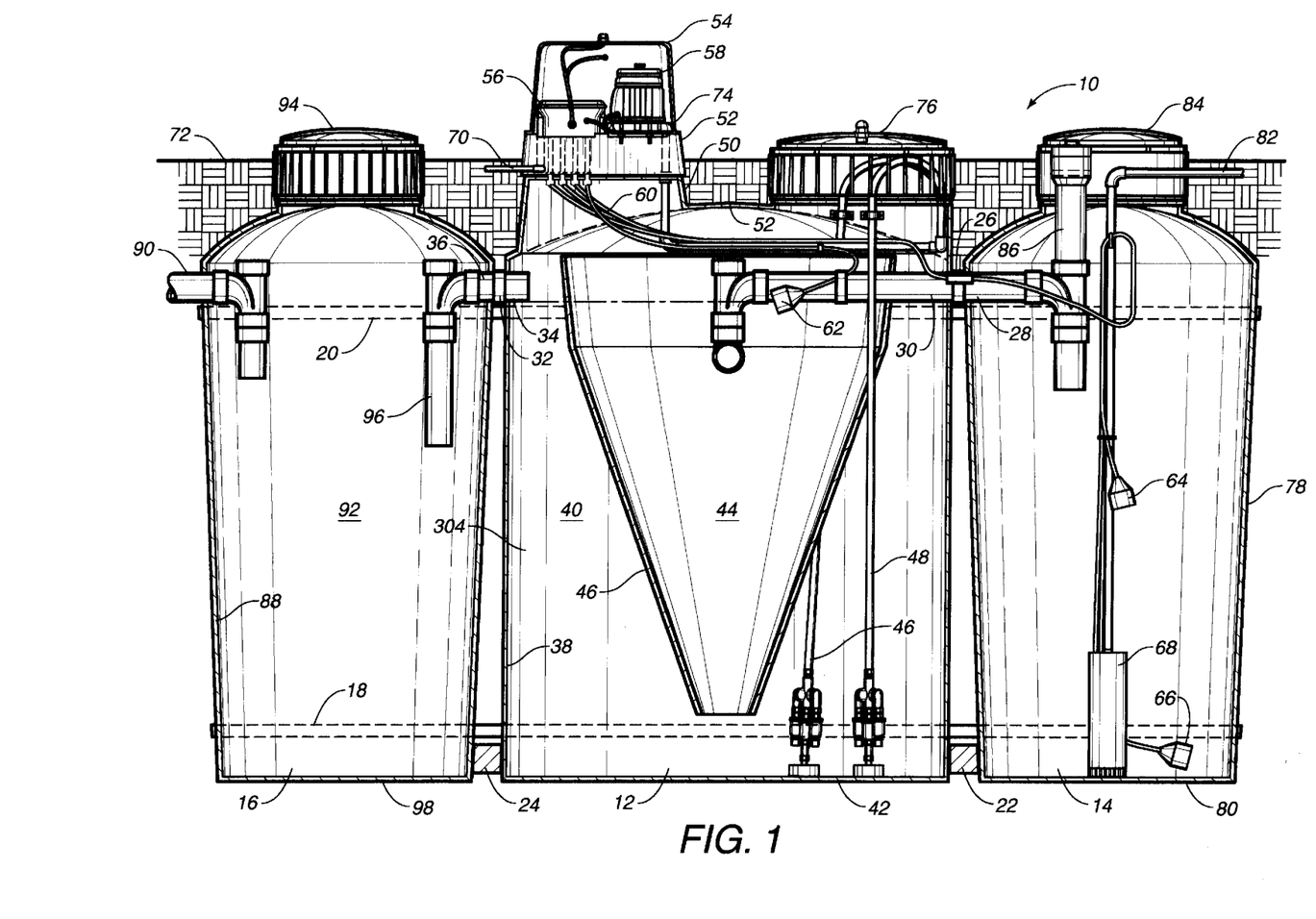
FIG. 1 is a side elevational view, in partial cross section, of the wastewater treatment system of the present invention.

Referring to FIG. 1, there is shown at 10 the wastewater treatment system in accordance with the present invention. The wastewater treatment system 10 includes a treatment tank 12, a pump tank 14, and a pretreatment tank 16. Each of these tanks 12, 14 and 16 is arranged so as to be in fixed spaced relationship to each other. In FIG. 1, a first band 18 extends around each of the tanks 12, 14 and 16 in compressive contact therewith. A second band 20 extends in spaced parallel relationship to the first band 18 so as to further maintain the tanks 12, 14 and 16 in generally fixed spaced relationship. A first saddle member 22 is positioned between the treatment tank 12 and the pump tank 14 generally adjacent to the bottom of each of the tanks 12 and 14. A second saddle member 24 is positioned between the pretreatment tank 16 and the treatment tank 12 so as to maintain the pretreatment tank 16 a desired spaced and fixed relationship from the treatment tank 12. A first spacer member 26 is positioned over an inlet to the pump tank 14 or over an outlet 30 of the treatment tank 12 so as to properly space the pump tank 14 from the treatment tank 12. A second spacer member is positioned over the inlet 34 of the treatment tank 12 or the outlet 36 of the pretreatment tank 16. Spacer member 32 serves to maintain the pretreatment tank 16 a desired spaced relationship from the treatment tank 12.

In particular, in FIG. 1, it can be seen that the treatment tank 12 has a wall 38 which extends therearound so as to define an interior volume 40. The wall 38 has a generally cylindrical configuration. The treatment tank 12 includes a bottom 42 of a generally flat planar configuration. The interior volume 40 defines an aeration compartment and a clarifier compartment 44. The clarifier compartment 44 is on the interior of the inverted frustoconical member 46 extending downwardly into the interior volume 40 of the treatment tank 42. Aerators 46 and 48 extend downwardly into the interior volume 40 of the treatment tank 12. The treatment tank 12 has a configuration similar to that described in prior U.S. application Ser. No. 09/151,327, filed on Sep. 11, 1998, and entitled "Wastewater Treatment System with Air Pump/Control Panel Platform", incorporated herein by reference.

As can be seen, the treatment tank 12 has a fiberglass platform 50 which extends upwardly from a top 52 of the treatment tank 12. A base 52 is placed on the platform 50. A cover 54 extends over a control panel 56 and a pump 58 positioned on the base 52. Electrical connections 60 extend to the control panel 56 through the interior of the treatment tank 12. The electrical connections 60 connect to a float switch 62 in the treatment tank 12 and to float switches 64 and 66 in the pump tank 14, and to the bottom suction pump 68 in the pump tank 14. The conduit 70 is positioned within the earth 72 so as to extend from a source of electrical power to the treatment tank 12. Conduit 70 will receive the electrical line which supplies power to the electrical lines 60 and to the pump 58. An air line 74 will extend from the air pump 58 to the aerators 46 and 48. A cover 76 is positioned over the top 52 of the treatment tank 12 so as to allow access to the aerators 46 and 48 and to the interior 40 of the treatment tank 12.

The inlet 34 of the treatment tank 12 is connected in fluid communication with the outlet 36 of the pretreatment tank 16. Similarly, the outlet 30 of the treatment tank 12 is connected in fluid communication with the inlet 28 of the pump tank 14.

The pump tank 14 has a wall 78 of generally cylindrical configuration. The pump tank 14 also has a flat planar bottom 80 in coplanar relationship with the bottom 42 of the treatment tank 12. Suction pump 68 is located adjacent to the bottom 80 of the pump tank 14. The suction pump 68 will serve to discharge liquids through the discharge pipe 82 which extends outwardly of the top 84 of the pump tank 14. A chlorinator 86 is positioned within the pump tank 14 so as to mix with the fluid passing from the outlet 30 of the treatment tank 12 and into the inlet 28 of the pump tank 14.

The pretreatment tank 16 has a wall 88 of a generally cylindrical configuration. As can be seen in FIG. 1, the wall 78 of the pump tank 14 and the wall 88 of the pretreatment tank 16 have a slightly tapered configuration. Although this tapered configuration is not required, a slight taper is desirable for the purposes of forming each of the walls 78 and 88 of a fiberglass material and for the purposes of removing the interior form or mold.

The pretreatment tank 16 has an inlet 90 which is suitably connected to the residential or commercial establishment. The inlet 90 allows the wastewater to flow into the interior volume 92 of the pretreatment tank 16. A cover 94 is positioned over the opening at the top of the pretreatment tank 16 so as to allow access to the interior of the pretreatment tank 16. The outlet 36 is connected to a vertical tube 96 which extends into the interior volume 92 of the pretreatment tank 16 to a level slightly below the level of the opening of the inlet 90. As such, liquids will flow from the interior volume 92 of the pretreatment tank 16 through the outlet 36 by the action of fluid displacement.

In FIG. 1, it can be seen that the band 18 will extend around the wall 88 of the pretreatment tank 16, the wall 38 of the treatment tank 12 and the wall 78 of the pump tank 14. The band 18 can be of a steel or polymeric material. The band can be suitably tightened, by known means, so as to exert a compressive force onto the respective walls of the tanks 12, 14 and 16. As such, the walls 38, 78 and 88 of each of the tanks 12, 14 and 16, respectively, will be urged toward one another. So as to prevent any possible damage to be caused by the compressive action of the band 18 and to maintain each of the tanks 12, 14 and 16 in a desirable upright configuration, a first saddle member 22 is positioned between the wall 78 of the pump tank 14 and the wall 38 of the treatment tank 12 adjacent to the bottoms 42 and 80 of the respective tanks. A second saddle member 24 is positioned adjacent to the bottom 98 of the pretreatment tank 16 and the bottom 42 of the treatment tank 12 in an area between the walls 38 and 88 of the respective tanks. The saddle members 22 and 24 will distribute the force caused by the compressive action of the band 18 over a wider area of the surface of each of the respective tanks. As such, damage caused by the compressive force between the respective tanks are prevented. Additionally, the saddle members 22 and 24 will cause the slightly tapered walls of the respective tanks to assume an upright position.

The second band 20 is positioned generally adjacent the upper portions of the tanks 12, 14 and 16. Bands 20 will exert a compressive force around the walls 38, 78 and 88 of the tanks 12, 14 and 16, respectively. So as to prevent undue compression between the wall 38 of the treatment tank 12 and the wall 78 of the pump tank 14, the first spacer member 26 is affixed over the piping which is part of the inlet 28 of the pump tank 14 or the outlet 30 of the treatment tank 12. Similarly, a spacer 32 is positioned on either the inlet 34 of the treatment tank 12 or the outlet 36 of the pretreatment tank 16. These spacer members will also assure that each of the tanks 12, 14 and 16 assumes an upright position and serves to avoid undue compressive contact between the fiberglass exteriors of the respective walls of these tanks. The use of the spacer members 26 and 32, along with the saddle members 22 and 24, assures that each of the components of the wastewater treatment system 10 of the present invention is arranged in a desired configuration. In actual practice, the gaskets associated with the inlets and outlets may be able to carry out the same spacing effect as the aforementioned spacers.

As can be seen in FIG. 1, the entire wastewater treatment system 10 is provided in an interconnected assembled bundled arrangement. As such, the entire system, with all of its electrical and fluidic connections already established, can be shipped as a single unit. Since the bottoms 42, 80 and 98 of the tanks 12, 14 and 16, respectively, are in a coplanar relationship, only a single excavation is required for the installation of the wastewater treatment system 10. Following the excavation and installation, it would be only necessary to connect an exterior electrical line to the conduit 72 and to connect the sewage line from the residence or the commercial establishment to the inlet 90 of the pretreatment tank 16. The discharge pipe 82 can be directed to any desired location for drip irrigation or for discharge purposes. As can be seen, the present invention eliminates all of the difficulties associated with the establishment of the electric and fluidic connections between each of the components of the system. The entire system can be shipped and installed as a single unit in a minimal amount of time.

Since each of the walls of the tanks 12, 14 and 16 is of a cylindrical configuration, the integrity of each of these walls is assured when fiberglass material is used. In certain prior art systems, a rectangular configuration is formed. However, straight planar walls with sharp corners will cause fiberglass to lose its structural integrity. Furthermore, each of the respective tanks 12, 14 and 16 includes its own interior area defined by the respective walls. There is no sharing of the walls which can be damaged or lose structural integrity. Eventually, if any of the tanks would need to be replaced, then that particular component cannot be removed without requiring replacement of the entire system.

Figure 2:
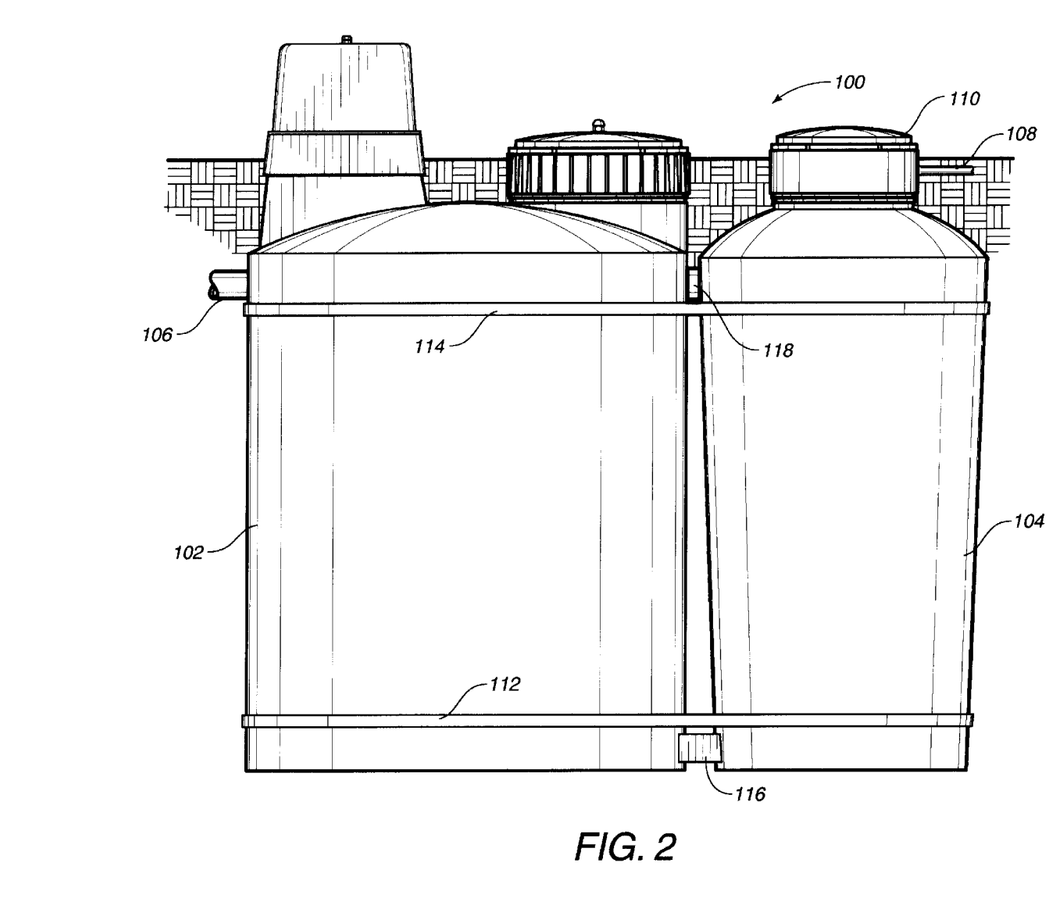
FIG. 2 is a side elevational view of the wastewater treatment system of the present invention.

Referring to FIG. 2, it can be seen that the system 100 includes only a treatment tank 102 and a pump tank 104. Under certain circumstances, the pretreatment tank will not be required. As such, the inlet 106 associated with the treatment tank 102 can be connected to the supply of wastewater. The tank 102 will include a similar configuration to that shown by tank 12 in FIG. 1. Similarly, the pump tank 104 will have a similar configuration to the pump tank 14 shown in FIG. 1. Discharge pipe 108 extends from the top 110 of the pump tank 104.

As can be seen in FIG. 2, the treatment tank 102 is joined to the pump tank 104 through the use of a first band 112 and a second band 114. The bands 112 and 114 extend around the exterior surfaces of the walls of the respective tanks 102 and 104. These bands 102 and 104 can be tightened and secured in compressive contact with the walls 102 and 104 by known steel band tightening mechanisms. It can be seen that a saddle member 116 is positioned between the treatment tank 102 and the pump tank 104 generally adjacent to the bottom of each of these tanks. A spacer member 118 is positioned over the outlet pipe from the treatment tank 102 (or the inlet pipe for the pump tank 104). The saddle member 116 and the spacer member 118 assure that each of the tanks 102 and 104 will have an upright posture within the excavation. Furthermore, the saddle member 116 and the spacer member 118 will assure that the fiberglass exterior of the tanks 102 and 104 does not have a sharp point of contact at the area of the joinder of the walls. FIG. 2 shows the present invention in its two-tank configuration.

Figure 3:
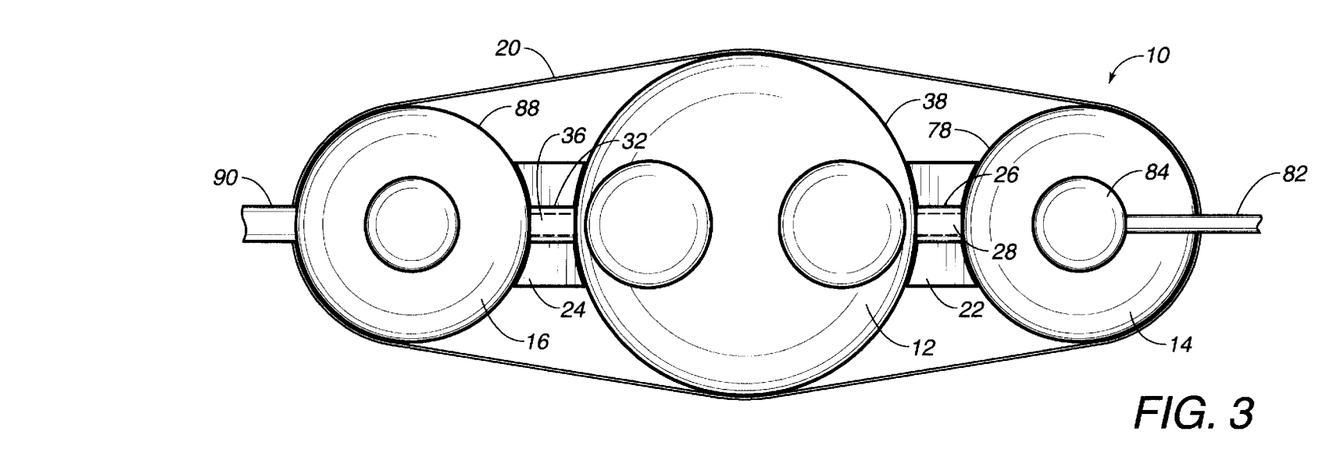
FIG. 3 is a plan view of one form of the present invention showing the connector in a generally oval configuration.

FIG. 3 is a general plan view of the wastewater treatment system 10, as shown in FIG. 1. As can be seen, the band 20 extends around a portion of the wall 88 of the pretreatment tank 16, a portion of the wall 38 of the treatment tank 12, and a portion of the wall 78 of the pump tank 14. The bands 20 will have a generally oval configuration. The saddle member 22 is illustrated as extending below the inlet 28 and below the spacer member 26. Similarly, the second saddle member 24 is shown as located below the outlet pipe 36 and its associated spacer member 32. The inlet pipe 90 is illustrated as entering the interior of the pretreatment tank 16 above the band 20. Similarly, the discharge pipe 82 is shown as leaving the top 84 of the pump tank 14 above the level of the band 20.

Figure 4:
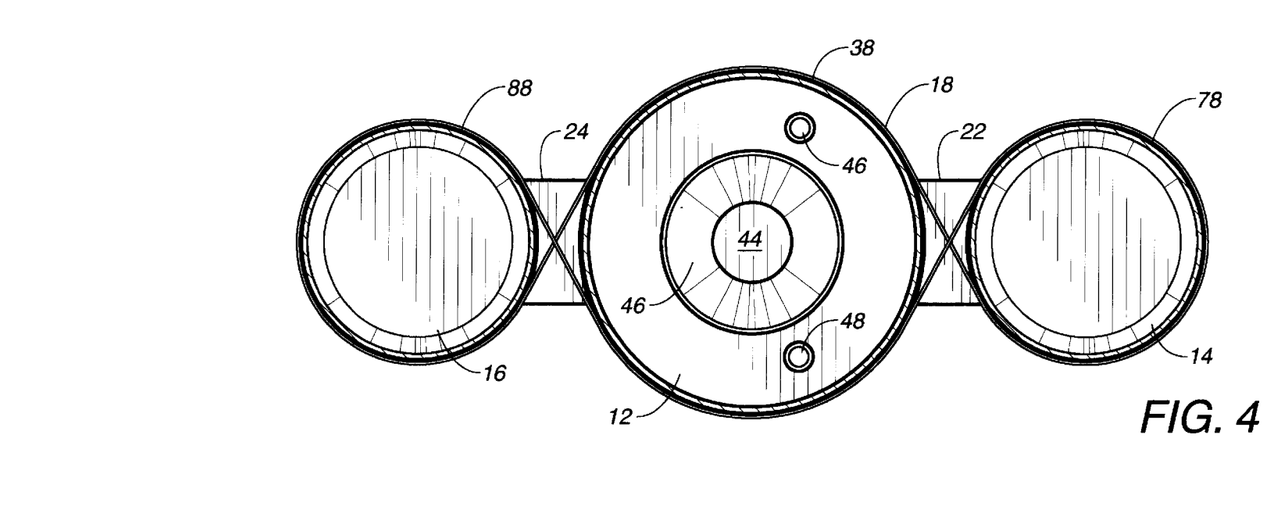
FIG. 4 is a plan view of a preferred embodiment of the present invention, in partial cross section, showing the double figure eight configuration of the band of the present invention.

FIG. 4 is a cross-sectional view showing the configuration of the band 18 in a double figure eight configuration. The arrangement shown in FIG. 4 is the preferred embodiment of the present invention. By using this double figure eight configuration of the band 18, there is established a maximum area of contact between the band 18 and the respective walls 88, 38 and 78 of the tanks 16, 12 and 14, respectively. In this arrangement, the band 18 will properly position each of the tanks 12, 14 and 16 in their desired spaced relationship while avoiding any possible damage to the fiberglass exterior of the respective tanks by contact with the band 18. The saddle member 22 is illustrated as positioned between the treatment tank 12 and the pump tank 14. The saddle member 24 is illustrated as positioned between the pretreatment tank 16 and the treatment tank 12.

Figure 5:
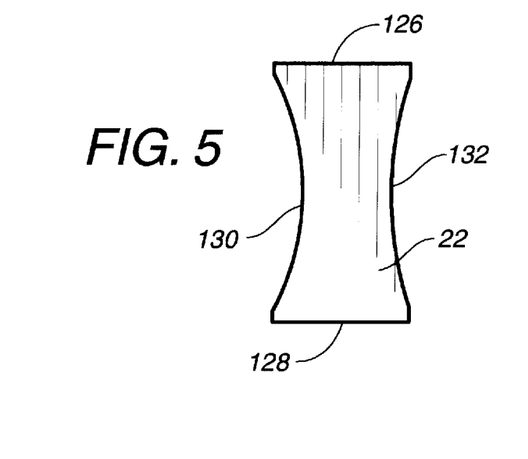
FIG. 5 is an isolated plan view of the saddle member used in the present invention.

FIG. 5 is an isolated view of the saddle member 22. As can be seen, the saddle member 22 has parallel and flat sides 126 and 128. Saddle member 22 includes a first curved side 130 which has a radius generally conforming to the circumference of the wall 38 of the treatment tank 12. The saddle member 22 has a second curved side wall 132 which has a radius which will conform to the circumference of the wall 78 of the pump tank 14. The second saddle member 24 will have a similar configuration as the saddle member 22.

Figure 6:
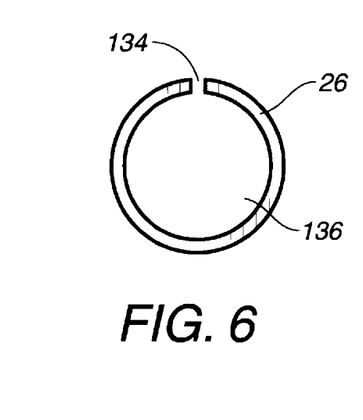
FIG. 6 is an end view showing the spacer member used in the present invention.

FIG. 6 shows the spacer member 26. As can be seen, the spacer member 26 is an annular ring with a split 134 located therein. The interior opening 136 will allow the outlet 30 of the treatment tank 12 (or the inlet 28 of the pump tank 14) to pass therethrough. The spacer member 26 can be formed of any suitably rigid material which will resist any compressive forces exerted by the walls 38 and 78 of the treatment tank 12 and the pump tank 14, respectively. The split 134 will allow the spacer member 26 to be suitably applied around the exterior of the tubular inlets. The spacer member 32 will have a similar configuration as spacer member 26.

Figure 7:
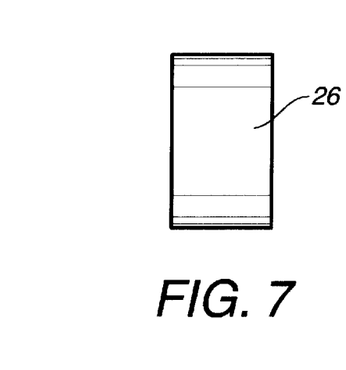
FIG. 7 is a side view of the spacer member used in the present invention.

FIG. 7 shows that the spacer member 26 has a suitable width so as to resist contact between the walls 38 and 78 of the tanks 12 and 14, respectively.

Figure 8:
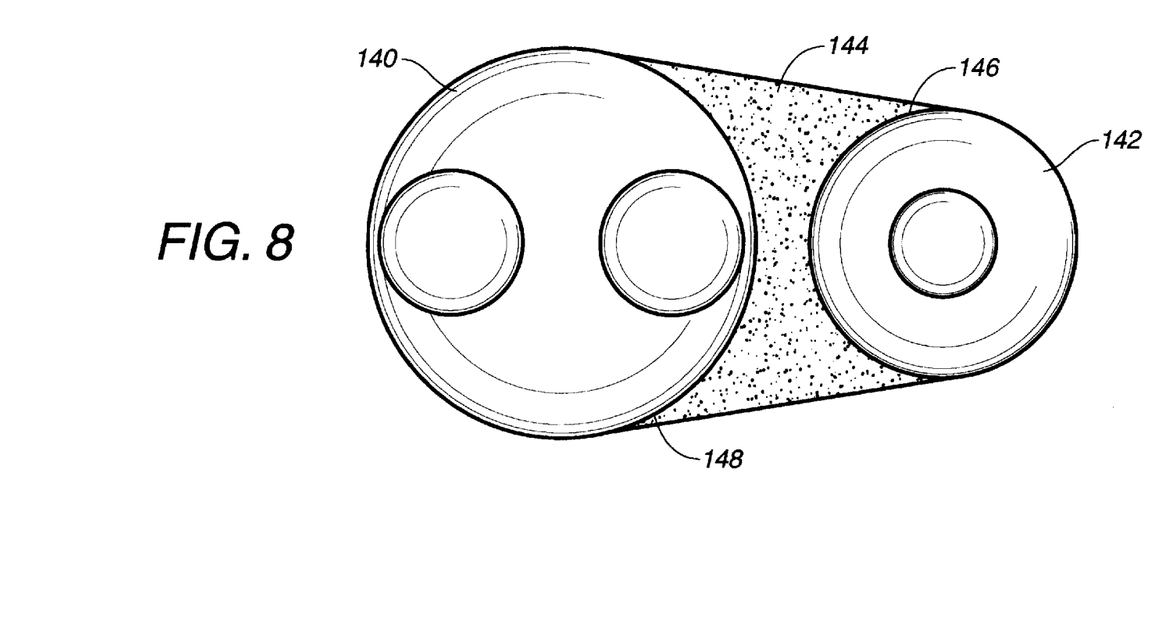
FIG. 8 is a plan view showing an alternative form of the present invention in which a polymeric material fills the spaces between the respective tanks.

FIG. 8 shows an alternative form of the present invention. In FIG. 8, it can be seen that a treatment tank 140 is positioned in spaced fixed relationship to the pump tank 142. So as to maintain this fixed spaced relationship, a polymeric material 144 is adhered to the wall 146 of the pump tank 142 and to the wall 148 of the treatment tank 140. This adherence can be carried out by the spraying of the polymeric material onto the surfaces 146 and 148 of the tanks 142 and 140, respectively. This spraying should be continued until the polymeric material 144 will fill the area between the respective tanks 140 and 142. In the preferred embodiment of the present invention, this polymeric material 144 should be a urethane foam. A suitable amount of foam should be applied so as to resist compression or separation between the tanks 140 and 142. Since the polymeric foam 144 is sprayed over a substantial surface area of the tanks 140 and 142, damage to the fiberglass exterior of these tanks should be prevented. It is believed that the urethane foam will have sufficient adherence and sufficient structural integrity so as to maintain the fixed spaced relationship of the tanks 140 and 142. The desired fluidic and electrical connections between the tanks 140 and 142 are formed before the application of the polymeric material 144. A disadvantage associated with the embodiment shown in FIG. 8 is that, with the use of such urethane foam, repair or replacement of the tanks 142 and 144 may be difficult because of the widespread coverage of the urethane foam 144.

Figure 9:
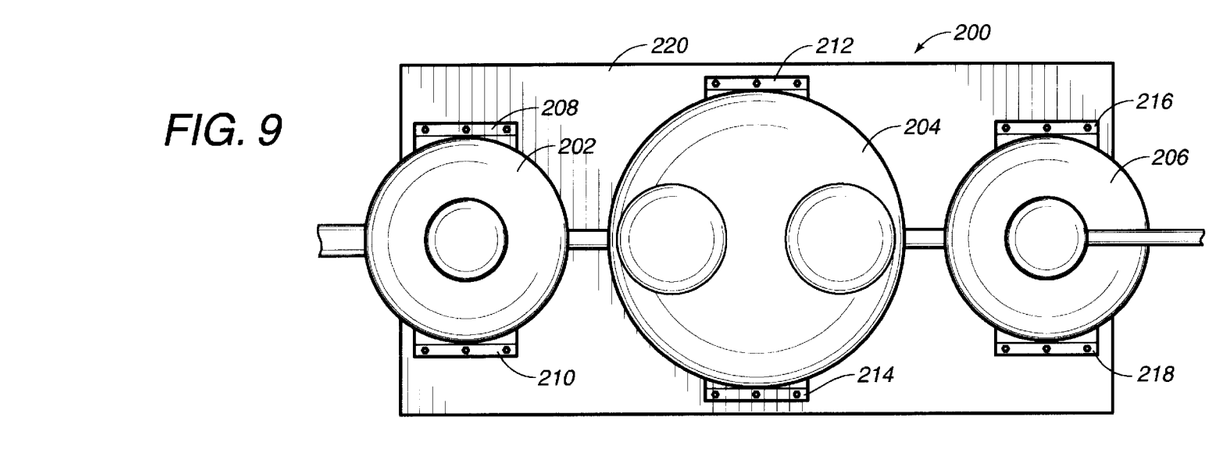
FIG. 9 is a plan view showing an alternative form of the present invention in which flanges associated with each of the tanks are bolted to a flat plate.

FIG. 9 shows another alternative form of the present invention. The wastewater treatment system 200 includes a pretreatment tank 202, a treatment tank 204 and a pump tank 206. Pretreatment tank 200 includes a first flanged area 208 and a second flanged area 210 located at the bottom of the tank 202. The treatment tank 204 includes a first flanged area 212 and a second flanged area 214 at a bottom thereof. The pump tank 206 includes a first flanged area 216 and a second flanged area 218 located at a bottom thereof. A flat plate 220 is positioned below the bottoms of each of the tanks 202, 204 and 206. The flat plate 220 can be suitably bolted to each of the flanged areas 208, 210, 212, 214, 216 and 218. As such, each of the tanks 202, 204 and 206 can be suitably secured to the flat plate 220 so as to be arranged in fixed spaced relationship to each other.

Figure 10:
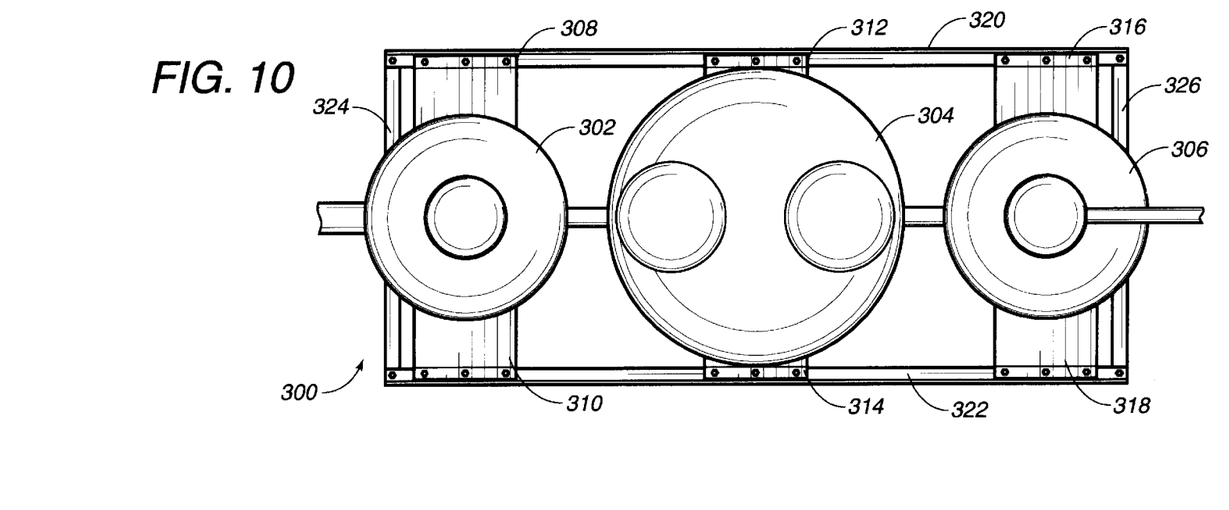
FIG. 10 is a plan view of the present invention showing an alternative form of the present invention in which flanges associated with each of the tanks are bolted to angle brackets extending between the tanks.

FIG. 10 shows another alternative embodiment of the present invention. In FIG. 10, the wastewater treatment system 300 includes a pretreatment tank 302, a treatment tank 304 and a pump tank 306. The pretreatment tank 302 includes a first flanged area 308 and a second flanged area 310. The treatment tank 304 includes a first flanged area 312 and a second flanged area 314. The pump tank 306 includes a first flanged area 316 and a second flanged area 318. These flanged areas 308, 310, 312, 314, 316 and 318 can be located in any location along the sides of the respective tanks 302, 304 and 306. These flanged areas should be located adjacent to the bottom of each of these tanks. A first angle bracket 320 is secured to the flanged areas 308, 312 and 316. A second angle bracket 322 is secured, by bolting, to the flanged areas 310, 314 and 318. The respective flanged areas should have bolt holes which allow bolts to be suitably placed therethrough and into the angle brackets 320 and 322. A cross member 324 can extend from the angle bracket 320 to the angle bracket 322 at one end of the wastewater treatment system 300 adjacent to the pretreatment tank 302. Another cross member 326 can be secured, by bolting, to the angle brackets 320 and 322 at an opposite end of the wastewater treatment system 300 adjacent to the pump tank 306. In this arrangement, it can be seen that each of the tanks 302, 304 and 306 can be placed in a fixed spaced relationship to each other. In this embodiment, the flanges and the angle brackets can be attached to the top of the tanks.

Figure 11:
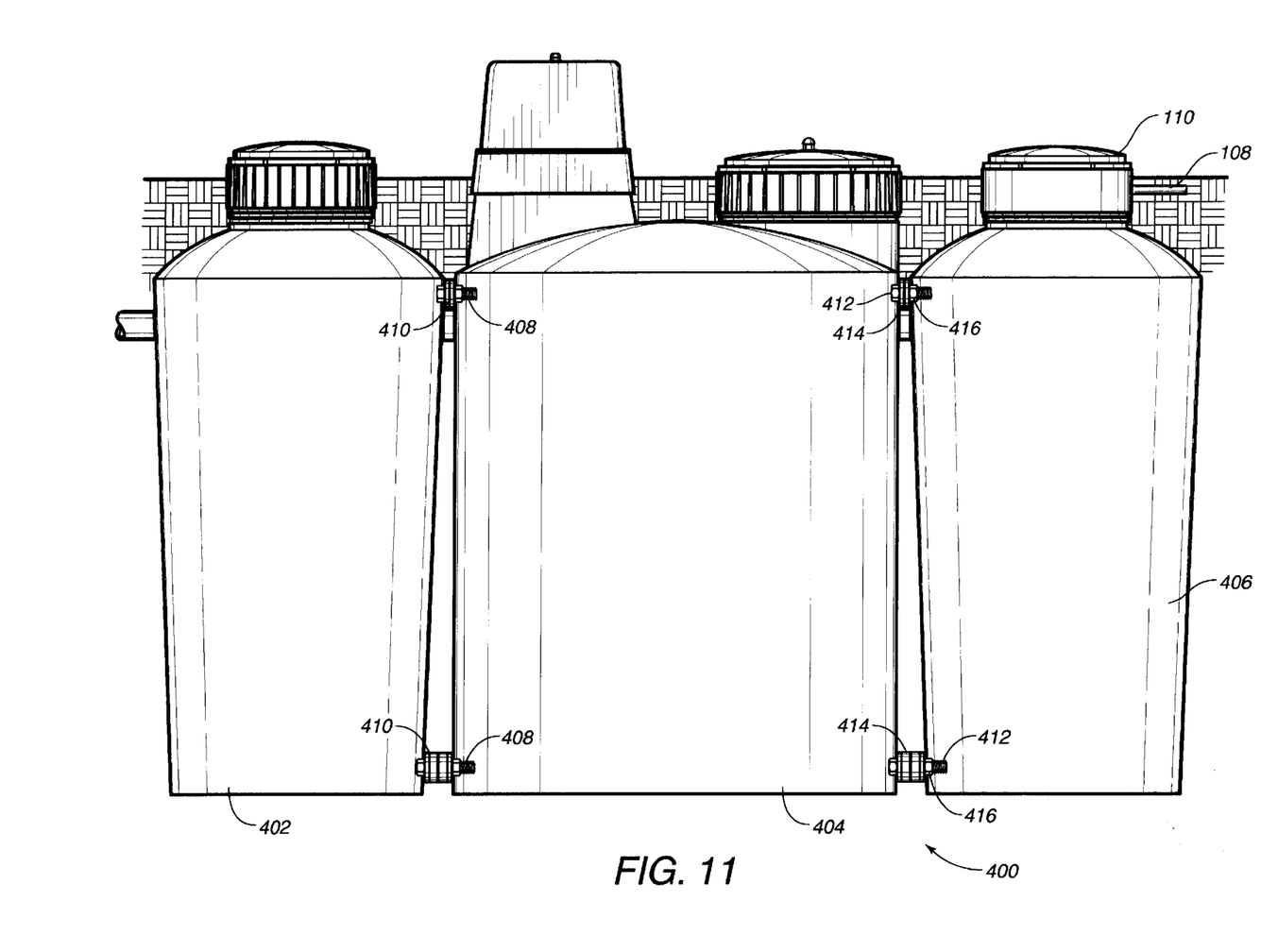
FIG. 11 shows a side elevational view, in partial cross section, of the present invention in which the tanks are bolted to one another.

FIG. 11 shows another embodiment of the present invention. In FIG. 11, the wastewater treatment system 400 includes a pretreatment tank 402, a treatment tank 404 and a pump tank 406. As can be seen, the treatment tank 404 is secured to the pretreatment tank 402 through a plurality of bolts 408. These bolts can be extended through the walls of the tanks 402 and 404 and secured by suitable nuts applied to one end of the bolt. Suitable washers 410 can be placed over the bolts 408 in the area between the pretreatment tank 402 and the treatment tank 404. The treatment tank 404 is secured to the pump tank 406 by a plurality of bolts 412. Bolts 412 extend through the wall of the treatment tank 404 and through the wall of the pump tank 406. Suitable washers 414 can be applied over the bolts 412 so as to properly space the treatment tank 404 from the pump tank 406. Nuts 416 can be secured over the end of the bolts 412 so as to assure the proper spacing between the respective tanks 404 and 406.

The arrangement of the present invention has many advantages over the prior art technique of the separate installation of multiple tanks into the earth. Multiple excavations of the earth are avoided. Any unevenness between the respective tanks is avoided. Each of the tanks will be positioned in a proper relationship to each other. It is only necessary to form a generally flat bottom surface within the excavation. All of the fluidic and electrical connections between the respective tanks are established prior to the installation of the tanks. The only additional effort that is required so as to properly connect the wastewater treatment system of the present invention to a source of wastewater is to connect the inlet to the treatment or pretreatment tank to the sewage pipe. Additionally, it is necessary to form a conduit line so that the electrical supply from a residence or a commercial establishment can be connected to a wastewater treatment system. Finally, the discharge pipe associated with the wastewater treatment system can be passed out of the system in the form of drip irrigation or other forms of discharge. Repair of the system is simple, if required, by simply removing the troublesome individual tank. The structural integrity of each of the tanks is maintained by having each of the components with its own separate walls. Damage to the fiberglass is prevented by the use of suitable spacer and saddle members. The present invention offers a significant improvement in the installation of such wastewater treatment systems by reducing the cost of labor and the cost of time associated by making all of the connections between the various tanks of the system at the "on site" location.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A wastewater treatment system comprising:
   a treatment tank having an inlet and an outlet, said treatment tank having a wall extending therearound so as to define an interior volume;
   a pump tank having an inlet in fluid communication with said outlet of said treatment tank, said pump tank having a wall extending therearound so as to define an interior volume, said wall of said pump tank being separate from said wall of said treatment tank; and
   a connector affixed to said wall of said treatment tank and to said wall of said pump tank so as to maintain said treatment tank and said pump tank in fixed spaced relationship to each other, said connector comprising a first band extending around a portion of a circumference of said wall of said treatment tank and a portion of a circumference of said wall of said pump tank.

2. The system of claim 1, further comprising:
   a pretreatment tank of a generally cylindrical configuration, said pretreatment tank having an outlet in fluid communication with said inlet of said treatment tank, said pretreatment tank having a wall extending therearound so as to define an interior volume of said pretreatment tank, said wall of said pretreatment tank being separate from said wall of said treatment tank, said connector affixed to said wall of said pretreatment tank so as to maintain said pretreatment tank and said treatment tank in fixed spaced relationship to each other.

3. The system of claim 1, said treatment tank having a bottom, said pump tank having a bottom, said bottom of said treatment tank and said bottom of said pump tank being in coplanar relationship.

4. The system of claim 2, said treatment tank having a bottom, said pump tank having a bottom, said pretreatment tank having a bottom in coplanar relationship with said bottom of said treatment tank and said bottom of said pump tank.

5. The system of claim 2, said pump tank and said pretreatment tank having a similar height.

6. The system of claim 2, each of said pretreatment tank, said treatment tank and said pump tank being formed of a fiberglass material.

7. The system of claim 1, said connector further comprising:
   a saddle member interposed between said wall of said treatment tank and said wall of said pump tank, said saddle adapted to maintain said wall of said treatment tank a fixed distance from said wall of said pump tank.

8. The system of claim 1, said first band extending in compressive contact with said walls of said treatment tank and said pump tank.

9. The system of claim 1, further comprising:
   a spacer member affixed around at least one of said outlet of said treatment tank and said inlet of said pump tank, said spacer member adapted to maintain said wall of said treatment tank a fixed distance from said wall of said pump tank.

10. The system of claim 9, further comprising:
    a second band extending in compressive contact with said walls of said treatment tank and said pump tank, said second band being in spaced parallel relationship with said first band.

11. The system of claim 1, said first band having a generally oval configuration extending around said portion of the walls of said treatment tank and said pump tank.

12. The system of claim 1, said first band having a generally figure eight configuration extending around said portions of the walls of said treatment tank and said pump tank.

13. The system of claim 2, said first band extending in compressive contact around a portion of a circumference of said wall of said pretreatment tank.

14. The system of claim 13, further comprising:
a first saddle member interposed between said wall of said treatment tank and said wall of said pump tank, said saddle member adapted to maintain said wall of said treatment tank a fixed distance from said wall of said pump tank; and
a second saddle member interposed between said wall of said pretreatment tank and said wall of said treatment tank, said second saddle member adapted to maintain said wall of said pretreatment tank a fixed distance from said wall of said treatment tank.

15. The system of claim 13, further comprising:
a first spacer member affixed around at least one of said outlet of said treatment tank and said inlet of said pump tank, said first spacer member adapted to maintain said wall of said treatment tank a fixed distance from said wall of said pump tank; and
a second spacer member affixed around at least one of said outlet of said pretreatment tank and said inlet of said treatment tank, said second spacer member adapted to maintain said wall of said pretreatment tank a fixed distance from said wall of said treatment tank.

16. The system of claim 13, further comprising:
a second band extending in compressive contact with said walls of said pretreatment tank and said treatment tank and said pump tank, said second band extending in spaced parallel relationship with said first band.

17. The system of claim 13, said first band having a generally oval configuration extending around said portion of said walls of said pretreatment tank, said treatment tank and said pump tank.

18. The system of claim 13, said first band having a generally double figure eight configuration extending around said portion of said walls of said pretreatment tank, said treatment tank and said pump tank.

19. The system of claim 1, each of said treatment tank and said pump tank being of a generally cylindrical configuration.

20. A wastewater treatment system comprising:
a treatment tank having an inlet and an outlet, said treatment tank having a wall extending therearound so as to define an interior volume;
a pump tank having an inlet in fluid communication with said outlet of said treatment tank, said pump tank having a wall extending therearound so as to define an interior volume, said wall of said pump tank being separate from said wall of said treatment tank; and
a connector affixed to said wall of said treatment tank and to said wall of said pump tank so as to maintain said treatment tank and said pump tank in fixed spaced relationship to each other, said connector comprising a polymeric material adhered to said walls of said treatment tank and said pump tank, said polymeric material filling a space between said wall of said treatment tank and said wall of said pump tank.

21. The system of claim 20, said polymeric material being a urethane foam.

22. A wastewater treatment system comprising:
a treatment tank having an inlet and an outlet, said treatment tank having a wall extending therearound so as to define an interior volume;
a pump tank having an inlet in fluid communication with said outlet of said treatment tank, said pump tank having a wall extending therearound so as to define an interior volume, said wall of said pump tank being separate from said wall of said treatment tank; and
a connector affixed to said wall of said treatment tank and to said wall of said pump tank so as to maintain said treatment tank and said pump tank in fixed spaced relationship to each other, said connector comprising:
a flange formed at a bottom of said treatment tank and said pump tank; and
a rigid member affixed to the flange of said treatment tank and said pump tank.

23. The system of claim 22, said rigid member comprising a flat plate.

24. The system of claim 22, said rigid member comprising an angle bracket secured by bolts to said flanges of said treatment tank and said pump tank.

* * * * *